United States Patent [19]

Kamburov et al.

[11] 4,056,725

[45] Nov. 1, 1977

[54] METHOD OF AND SYSTEM FOR COMPENSATING THE DISTORTION OF AMPLITUDE SPECTRA OF MULTICHANNEL ANALYZERS IN SPECTROMETRY

[75] Inventors: Hristo Kirilov Kamburov; Ivan Danailov Vankov; Ivan Yordanov Donev, all of Sofia, Bulgaria

[73] Assignee: Institute za Yadreni Izsledvania I Yadrena Energetika pri Ban, Sofia, Bulgaria

[21] Appl. No.: 641,179

[22] Filed: Dec. 16, 1975

[51] Int. Cl.[2] .................... G01T 1/00; G01T 3/00
[52] U.S. Cl. .................................. 250/336; 250/392
[58] Field of Search ............... 250/390, 391, 392, 336

[56] References Cited

U.S. PATENT DOCUMENTS

| | | | |
|---|---|---|---|
| 3,129,329 | 4/1964 | Love et al. | 250/392 |
| 3,873,840 | 3/1975 | Ellis | 250/392 |
| 3,931,522 | 1/1976 | Rusch | 250/392 X |

*Primary Examiner*—Archie R. Borchelt
*Attorney, Agent, or Firm*—Karl F. Ross

[57] ABSTRACT

Pulses from a particle detector and a reference-pulse generator are fed to a multichannel analyzer converting the pulse amplitudes into binary signals appearing on its stage outputs, certain of these stage outputs being connected to a pair of decoders in such a way that one decoder responds to pulse amplitudes in a first group of $n$ channels whereas the other decoder registers amplitudes in a second $n$-channel group divided into two halves which bracket the first group. The reference pulses are of such amplitude as to fall in the middle of the first channel group; if a measuring pulse in the detector output coincides with a reference pulse, the amplitude of the latter is either increased or decreased so as to fall mainly in one or the other half of the second group. A logic network controlled by the pulse generator energizes a forward-stepping or a backward-stepping input of a reversible pulse counter from the output of the first or the second decoder, respectively, according to whether a reference pulse occurs alone or is accompanied by a measuring pulse. When the counter reaches the limit of its counting capacity, the analyzer is cut off. The times required to attain a full count are compared for a standard sample and a test sample.

10 Claims, 1 Drawing Figure

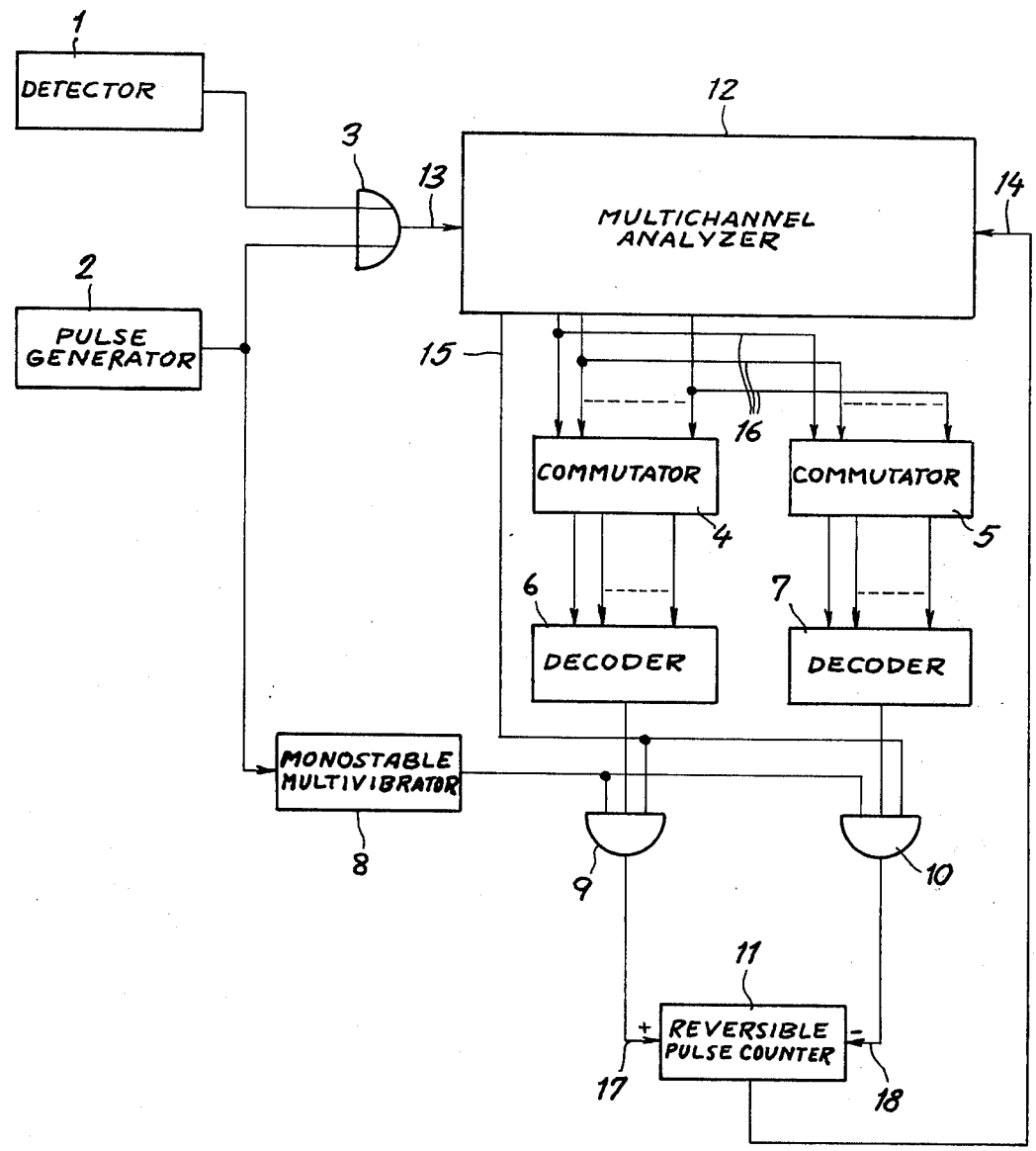

METHOD OF AND SYSTEM FOR COMPENSATING THE DISTORTION OF AMPLITUDE SPECTRA OF MULTICHANNEL ANALYZERS IN SPECTROMETRY

FIELD OF THE INVENTION

The present invention relates to a method of and a system for compensating the distortion of the amplitude spectrum of a multichannel analyzer, used in spectrometry, which is due to the diminution of the net area of the total absorption peaks as a result of pulse loss because of "off" time and because the amplitude distribution of the pulses changes after their mutual superposition during neutron-activation analysis.

BACKGROUND OF THE INVENTION

So far there have been proposed a number of methods and devices for compensating the decrease of net area of total absorption peaks in the amplitude spectra, due either to "off" time or to pulse superposition.

To compensate the loss due to "off" time in all conventional spectrometric analyzers, means are provided for measuring the net time, called also operating or "on" time of the analyzer, throughout which the input of the analyzer is opened to accept pulses from a detector responsive to a stream of particles, such as neutrons, from the samples. The duration of each measurement is defined by the "on" time and the diminution of the net area of the total absorption peaks, due to the "off" time, and is compensated through virtual prolongation of the measurement duration.

A disadvantage of this method resides in the pulse losses due to the "off" time of electronic devices connected ahead of the analog-to-digital converter of the analyzer and the detector.

A further method has become known for compensating the decrease of the net peak area by measuring both the standard sample and the test sample simultaneously with another radioactive isotope, serving as an internal reference, with equal quantities used in both measurements. The ratio of the net areas of the peak of total absorption of this isotope, obtained after both measurements, defines the decrease of the net area of the test sample as compared to that of the standard sample. This method has the following disadvantages: the isotope chosen for the internal reference should be of an element absent in the test sample, which requires either preliminary knowledge of the chemical composition of the specimen to be tested or performace of separate tests for qualitative determination of this composition; a large number of various isotopes should be available in order to find out a proper internal reference for each test; the internal reference itself charges additionally the detector system and prolongs the total duration of the tests; to obtain the final results, additional calculations are required along with introduction of a corrective factor; the correction performed produces a certain error due both to the statistical distribution of the pulses from the internal reference and to the inability to distinguish them from pulses of like amplitude for the test sample and the background.

Another method is known wherein the testing of standard samples is carried out under conditions of pulse loading of the detector and analyzer duplicating those existing with the test sample. For this purpose a mixture of radioactive isotopes, of a quantitive composition close to that of the test sample, is tested along with the standard sample. The disadvantage of this method is its high labor cost and waste of time for choosing and testing the isotope mixture several times in order to achieve similarity with the composition of the test sample, this mixture varying with different samples, as well as the limited efficiency of the method and its inability to evaluate the error, because no perfect identity between the sample and the isotope can be achieved and the significance of the residual difference cannot be estimated quantitatively.

Electronic rejectors have also been proposed which separate the pulses whose amplitue is changed because of superposition before the pulses are transmitted to the analyzer. As soon as the rejectors are switched on, the change in the shapes of the peaks of total absorption disappears. The disadvantage of the rejectors, along with their being too complex and too expensive, is their inability to estimate quantitatively the separate pulses from each peak and therefore they cannot be applied in quantitative analyses.

OBJECT OF THE INVENTION

The object of our invention is to provide a method of quantitative spectrometry, together with a system for its implementation, designed to compensate the distortion of amplitude spectra of multichannel analyzers, due both to "off" time and to pulse superposition, during the measuring operation itself.

SUMMARY OF THE INVENTION

In accordance with our present invention, a measuring pulse due to particle emission from a sample is converted in a conventional multichannel analyzer into a digital signal identifying one of a multiplicity of channels corresponding to respective pulse amplitudes, this analyzer concurrently receiving a train of reference pulses and the measuring pulses produced by a suitable detector in the presence of either a specimen to be tested or a standard of comparison, as is well kown per se. The reference pulses are of stable frequency and of an amplitude chosen to fall within a first group of channels if no measuring pulse is simultaneously present. If, however, a reference pulse coincides with such a measuring pulse, its amplitude is modified so that the analyzer identifies a channel of a second group in lieu of the aforementioned first group. From the occurrences of identification of channels in the first and second groups we can determine the ratio of reference-pulse rate to measuring-pulse rate for both a standard sample and a test sample to be compared therewith.

In structural terms, our invention envisages the provision of a reversible pulse counter having a forward-stepping input connected to a first decoder and a backward-stepping input connected to a second decoder. The first decoder is connected to certain stage outputs of the analyzer for emitting a first counting pulse in response to a pulse amplitude in a pulse-receiving input of the analyzer, falling within the aforementioned first channel group, this input being connected to outputs of the detector and of a reference-pulse generator. The second decoder is connected to other stage outputs of the analyzer for emitting a second counting pulse in response to a pulse amplitude falling within the second channel group. The transmission of these counting pulses from the decoders to the reversible counter is controlled by the pulse generator, with the aid of interposed gate means, and is allowed to take place only within a limited period following the generation of any reference pulse.

That period may be measured by timing means, such as a monostable multivibrator, triggerable by the pulse generator. We further prefer to inhibit the transmission of the counting pulses also pending conversion of the incoming-pulse amplitude into a digital code, within the multichannel analyzer, by means of a connection from a further output of that analyzer to the gating means.

According to another feature of our invention, the second channel group is split into two preferably equal subgroups bracketing the first channel group.

BRIEF DESCRIPTION OF THE DRAWING

The above and further features of our invention will now be described in detail with reference to the accompanying drawing the sole FIGURE of which diagrammatically illustrates a representative embodiment.

SPECIFIC DESCRIPTION

In the drawing we have shown a detector 1 responsive to a flow of particles from samples to be measured, a generator 2 of reference pulses of adjustable amplitude and high stability of both amplitude and frequency, a two-input OR gate 3, two commutators 4 and 5, two decoders 6 and 7, a monostable multivibrator 8, a pair of three-input AND gates 9 and 10, a reversible pulse counter 11 of adjustable counting capacity, a multichannel amplitude analyzer 12 with an input 13 for the pulses to be measured, an input 14 for controlling the entry of pulses into the analyzer, an output 15 for signaling the end of the analog-to-digital conversion of each pulse, and outputs 16 from the stages of its address register including nonillustrated means for stabilizing the position of the peak. The output of the detector 1 is connected to one of the inputs of the OR gate 3. The output of the reference-pulse generator 2 is connected both to the second input of OR gate 3 and to the input of monostable multivibrator 8. The output of OR gate 3 is connected to the pulse-receiving input 13 of analyzer 12, the inputs of commutators 4 and 5 are connected to the stage 16 of the address register, the outputs of commutator 4 are connected to the inputs of decoder 6, and the outputs of commutator 5 are connected to the inputs of decoder 7. The output of decoder 6 is connected to the first input of AND gate 9, and the output of decoder 7 is connected to the first input of AND gate 10. The second inputs of both AND gates 9 and 10 are connected to the output of monostable multivibrator 8, and their third inputs are tied to the output 15 for signaling the end of pulse conversion. The output of AND gate 9 is connected to a forward-stepping input 17 of the reversible pulse counter 11 and the output of AND gate 10 is connected to a backward-stepping input 18 of the same counter 11. The output of the reversible pulse counter 11 is connected to the input 14 for pulse-entry control.

The mode of operation of the illustrated embodiment is as follows:

By means of commutator 4 a first group of $n$ channels is so chosen, e.g. with $n = 10$, that the number of measuring pulses entering them should be minimal, for instance from the 3101st channel to the 3110th channel. The amplitude of the reference pulses is so chosen that when measuring pulses from the detector 1 do not enter the analyzer, the reference pulses are registered in the middle of this group of $n$ channels, in this case channels Nos. 3105 and 3106. By means of commutator 5 a second group of $n$ channels is chosen, each divided into two subgroups of $n/b\ 2 = 5$ channels which bracket the channels of the first group; here the lower group encompasses channels Nos. 3096 to 3100 while the upper one consists of channels Nos. 3111 to 3115. When the OR gate 3 conducts a measuring operation, the reference pulses mingle with the measuring pulses from the detector 1 and because of the superposition are registered in channels of either group. When in the address register of the analyzer the codes of any of the first group of channels (Nos. 3101–3110) appear, the decoder 6 produces at its output an enabling potential applied to the first input of the AND gate 9. In the case of a reference pulse there appears simultaneously with it, at the second input of the same AND gate 9, a timing pulse from the output of monostable multivibrator 8 which is 2 – 3% wider than the maximum time required for the analog-to-digital pulse conversion in the analyzer. Upon termination of this coding operation, there appears at the output 15 of the analyzer a signal energizing the third input of AND gate 9 and advances the reversible pulse counter 11 by one step. The triple coincidence is necessary to avoid the counting of sample pulses of the same amplitude not originating from the reference-pulse generator 2 and to prevent a stepping of the counter while the address register codes a pulse with an amplitude larger than that of the reference pulses. Similarly, when a reference pulse is coded in one of the chanels of the second group, the decoder 7 and the AND gate 10 are effective to step back the reversible pulse counter 11.

When the reversible pulse counter 11 reaches the selected limit of its counting capacity, it sends a stop signal to the control input 14 of analyzer 12 and the measurement is discontinued.

Each measurement is performed in the following sequence: first the two groups of $n$ channels each are chosen. Then the amplitude of the reference pulses is adjusted so that they should be registered in the middle of the first group of $n$ channels, with the detector 1 switched off. Next, the peak of the reference pulses from the generator 2 is stabilized by the corresponding circuitry of analyzer 12. The capacity of the reversible pulse counter 11 is so chosen that the time required for a full count affords the desired statistical measuring accuracy. The standard sample is now measured until the difference between the number of reference pulses registered in the first $n$-channel group and those registered in the second $n$-channel group, measured by the pulse counter 11, reaches a valve equal to the chosen counting capacity. Then the test sample is measured; at this point the general activity registered by the detector and hence the pulse load of the analyzer are considerably increased. Therefore a greater number of reference pulses have their amplitude changed by the superposition and are registered in the second $n$-channel group instead of the first one. Besides, a greater number of those pulses fail to enter analyzer 12 because of its "off" time. As a result, the number of forward-stepping pulses per unit time reaching the reversible pulse counter diminishes while the number of backward-stepping pulses increases. Therefore the chosen counting limit of the reversible pulse counter is attained more slowly and the measuring time is prolonged. This lengthening of the measuring time, which is in proportion to the diminution of the area of the reference-pulse peak as a result of both the superposition and the "off" time, balances the reduction of the net area of the peaks in the spectrum of the test sample. Thus the results obtained from the two measurements can be compared directly without eliminating the corrective factors and the quantities required are defined directly by the ratios between the net areas of the respective peaks from the standard sample and the test sample.

The advantages of the method and system according to our invention are the high measuring accuracy and the fact that the final result is obtained without intermediate calculations.

What we claim is:

1. A method of compensating pulse-amplitude distortion in a spectrometric operation in which a measuring pulse due to particle emission from a sample is converted in a multichannel analyzer into a digital signal identifying one of a multiplicity of channels corresponding to a respective pulse amplitude, comprising the steps of:

generating a train of reference pulses of stable frequency and of an amplitude falling within a first group of said channels;

concurrently feeding said reference pulses and measuring pulses to said multichannel analyzer for identifying, upon a coincidence of a reference pulse with a measuring pulse, a channel within a second group of said channels corresponding to the combined amplitude of the coincident pulses; and determining, from the occurences of identification of channels in said first and second groups, the ratio of reference-pulse rate to measuring-pulse rate for a standard sample and a test sample to be compared therewith.

2. A method as defined in claim 1 wherein said first and second groups of channels are immediately adjacent each other.

3. A method as defined in claim 1 wherein said second group of channels is divided into two subgroups bracketing said first group of channels.

4. A method as defined in claim 3 wherein said subgroups encompass the same number of channels.

5. A method as defined in claim 1 wherein the number of channels in said first and second groups is the same.

6. A system for compensating pulse-amplitude distortion in a spectrometric operation in which a pulse due to particle emission from a sample is converted into a digital signal identifying one of a multiplicity of channels corresponding to a respective pulse amplitude, comprising:

detector means for generating measuring pulses in response to the flow of particles from a sample to be measured;

a generator of reference pulses of predetermined frequency and amplitude;

a multichannel analyzer converting the amplitudes of incoming pulses into digital codes identifying a multiplicity of channels, said analyzer having a pulse-receiving input and a set of stage outputs carrying said digital codes, said detector means and said generator having outputs connected to said pulse-receiving input;

a first decoder connected to certain of said stage outputs for emitting a first counting pulse in response to a pulse amplitude in said pulse-receiving input falling within a predetermined first group of said channels encompassing the amplitude of said reference pulses;

a second decoder connected to other of said stage outputs for emitting a second counting pulse in response to a pulse amplitude in said pulse-receiving input falling within a predetermined second group of said channels adjoining said first group;

a reversible pulse counter having a forward-stepping input connected to said first decoder and a backward-stepping input connected to said second decoder for respectively receiving said first and second counting pulses therefrom; and gating means controlled by said generator and interposed between said decoders and said pulse counter for allowing the transmission of a counting pulse only within a limited period following the generation of any reference pulse.

7. A system as defined in claim 6 wherein said analyzer is provided with a control input connected to said pulse counter for preventing the introduction of incoming pulses via said pulse-receiving input upon said pulse counter reaching a predetermined count.

8. A system as defined in clam 6 wherein said second group of channels is split into halves bracketing said first group of channels.

9. A system as defined in claim 6 wherein said analyzer is provided with a further output connected to said gating means for inhibiting the transmission of counting pulses pending conversion of an incoming-pulse amplitude into a digital code.

10. A system as defined in claim 9, further comprising timing means normally blocking said gating means, said timing means being triggerable by said generator for unblocking said gating means in response to each reference pulse for a period sufficient to enable said conversion.

* * * * *